May 11, 1943.　　　L. C. WERKING　　　2,318,728
DIFFUSION OF GASES INTO LIQUIDS
Filed Feb. 2, 1940
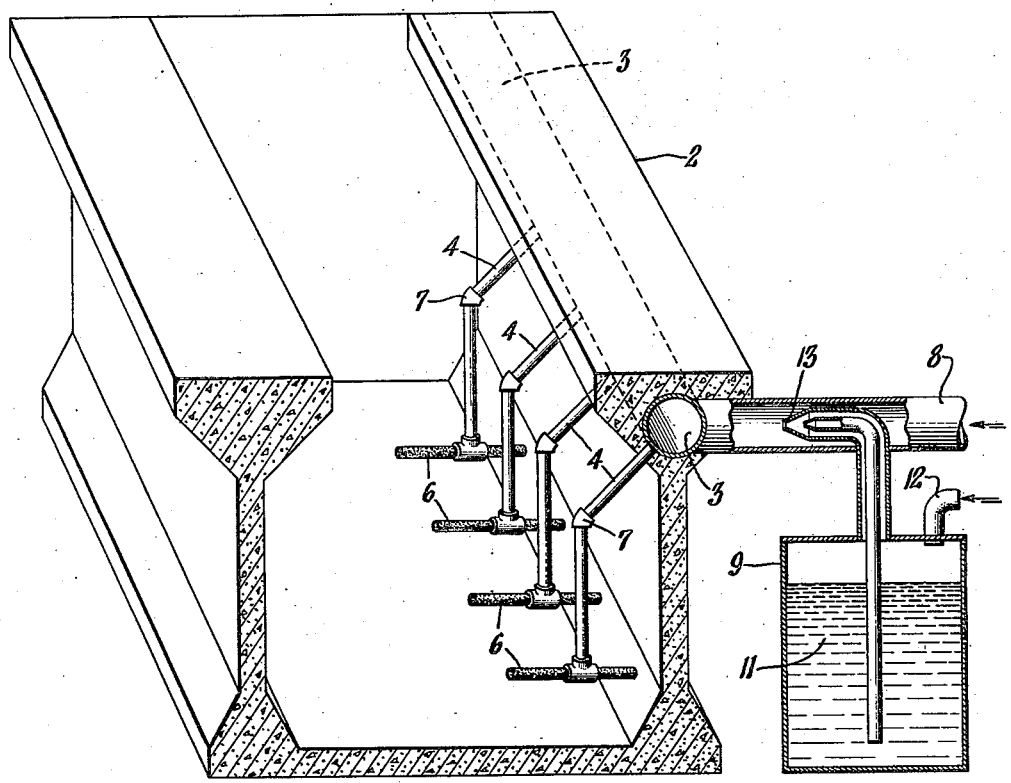
INVENTOR
LEROY C. WERKING
BY
ATTORNEY

UNITED STATES PATENT OFFICE 2,318,728

DIFFUSION OF GASES INTO LIQUIDS

Leroy C. Werking, Cleveland, Ohio, assignor to National Carbon Company, Inc., a corporation of New York Application February 2, 1940, Serial No. 316,933

9 Claims. (Cl. 261—122)

The invention relates to the diffusion of gases into liquids through porous materials, and is particularly concerned with an improved method and means for accomplishing such diffusion.

Among many processes employing gas diffusion into liquids, an important and well known one consists in the aeration of sewage in the so-called activated sludge process of sewage treatment. As a typical use for the invention it will be described as applied to a sewage aeration system, although in broadest scope many other applications are contemplated where similar diffusion problems may occur.

The advantages of aerating sewage by means of diffusers composed of porous materials have been recognized, and the more uniform, rapid and complete aeration, which can be accomplished by introduction of air under pressure through porous diffusers, is of established value in this art. Ceramic materials, both natural and artificial, and porous carbon have been proposed and used for this purpose, in the form of plates, conduits and tubes of various shapes. Certain limits to the satisfactory function of these materials have, however, been encountered, since wide variations commonly occur in the character and composition of sewage liquids requiring treatment. The tendency of the pores of the diffuser to become plugged or clogged with solid matter is an ever present difficulty, which will greatly increase the air pressure drop through the diffuser, and often necessitates frequent cleaning or renewing of the diffuser elements. Pore plugging becomes especially severe in treating sewage containing trade wastes, which may include, for example, soluble iron salts, which upon aeration are converted to insoluble ferric compounds. Deposition of solids in the diffuser pores, either from a suspension in the sewage or by oxidation at the diffuser-liquid interface, will in fact often entirely destroy the advantages and economy of diffusion by porous media.

It is an object of this invention to provide improvements in porous diffusing media which will enhance and extend their advantages as a gas diffuser for liquids. Another object is to provide means for retarding or preventing pore clogging of porous gas diffusers by solids contained or formed in the liquid contacting the diffuser. A further object is to provide improved means for sewage aeration by porous diffusers which will avoid the above-mentioned pore clogging difficulties.

I have found that a treatment or impregnation of porous diffusers with an oleaginous material will greatly retard or entirely prevent the deposition of solids in the pores of the diffuser. The treatment is effected so as to produce a superficial thin oily coating on the pore surfaces without obstructing or decreasing to an appreciable extent the gas permeability of the diffuser, and it is preferably accomplished by continuously or intermittently introducing the impregnating agent directly into the gas stream during diffusion. For example, a fine mist of a low viscosity petroleum oil introduced into the air stream just prior to its passage into the diffuser will uniformly and completely coat all pore surfaces, and this method of treatment will provide practically a permanent prevention of plugging. The amount of impregnant needed can be easily controlled to suit the particular diffuser system used, and while certain excess is not objectionable, and will be blown through the diffuser with the air, amounts sufficient to cause flooding of the pores should be avoided.

The impregnant creates a lubricous surface film quite unadapted to the attachment of solid material, it retards wetting of the diffuser pores with liquid, and reduces the pressure drop through the diffuser for a required gas flow. The eroding or wearing away of the superficial oil film further prevents a permanent deposition of pore plugging solids, and the film can be readily renewed, either continuously or intermittently, as desired. While various oils can be used as impregnants, it is essential to an attainment of the best results that they be of non-drying character and capable of forming a semi-permanent non-rigid pore coating, rather than one of hard, dry and more permanently set properties. Mineral oils are well suited as impregnants, particularly petroleum lubricating oils of low viscosity which can be readily atomized into a mist in the diffusing air stream.

Many tests have been made under conditions simulating those encountered in sewage aeration where severe plugging occurs. As above indicated, the presence of oxidizable iron salts in the sewage liquid, as accumulated from steel mill wastes, presents a particularly difficult plugging situation. In these tests porous carbon diffusers were operated continuously over extended periods introducing air into solutions containing high iron salt concentrations and the amount of plugging encountered was determined by measuring the increase in air pressure drop through the diffusers at certain intervals. With standardized operating conditions, unimpregnated diffusers were compared with those treated in the manner of this invention. The control diffusers without oil impregnation were badly plugged at the end of ten days and on the sixteenth day all untreated diffusers became entirely inoperative. By comparison the diffusers treated with a light petroleum base oil mist showed but a very slight increase in pressure drop during this period, and were still operating satisfactorily after thirty-nine days when the tests were discontinued.

The accompanying drawing is further illustrative of the invention, showing schematically one embodiment thereof in a sewage aeration system. In the drawing there is represented in perspective a portion of an elongated treating tank or channel 2 of concrete or other ceramic material, carrying an air main or header 3 extending throughout the length of an upper top portion. A series of spaced pipes 4 connected with the header 3 carry compressed air to the diffuser units 6 located near the bottom of the tank. The diffusers shown are tubular in shape and consist of porous carbon. For clearness in the drawing only one diffuser unit is shown on the end of each lead pipe 4, although each air connection may support a number of parallel spaced units, so as to provide a continuous closely spaced row of diffusers down one entire side of the aerating tank. The form, shape, and material of the diffusers may also be varied, and the joints 7 in the pipe lines 4 can be of a swivel type to allow diffusers to be swung out of the tank, one or a few at a time, for inspection or replacement, without empting the tank or interrupting the aeration. The main air stream enters the header 3 through the duct 8, and at this point a fine dispersion or mist of oil is intimately mixed with the incoming air, by means of a conventional type of aspirator or atomizer 9. The oil 11 in the atomizer is a low viscosity lubricating oil, one commercially known as "junior red oil" being suitable, and compressed air introduced through the port 12 produces, by a combination of pressure and aspiration, a fine oil spray at the nozzle 13. This oil mist or spray flows with the air into the diffusers where it forms a uniform thin oil coating on the pores, and introduction of the oil may be made continuously or intermittently as the particular conditions in the sewage liquid may require.

As indicated in the drawing description, the invention is applicable to the treatment of all known types and kinds of porous gas diffuser elements including those composed of ceramic materials as well as carbon. With porous carbon, however, particularly advantages reside, because of the generally finer pore structure of such diffusers. The high, uniform, and carefully controlled porosity of carbon diffusers is of recognized value in aerating liquids, and such carbon consists of a special grade of material available commercially, and known for its excellent gas diffusion ability. Where porous carbon is referred to specifically herein, it is intended to means this particular grade, which is more fully disclosed and described in U. S. Patent 1,988,478, issued to B. E. Broadwell and L. C. Werking on January 22, 1935. This material comprises essentially a mass of uniformly sized solid carbon particles, bonded with porous carbon to form a rigid, uniformly porous material in which the pores are interconnected in all directions. The length of the pore passages is very great in relation to their diameters, the diameters being on the average less than 0.05 mm. in diameter.

The invention substantially enhances the advantages of porous carbon for the diffusion of gases into liquids, and while the aeration of sewage represents an important and valuable use of these oil-treated diffusers, there are many other industrial processes to which the invention may be applied with similar advantages. It will be understood that the apparatus described is purely illustrative, and not limiting to the invention, and that within the scope of the broader appended claims numerous use embodiments of the invention are intended to be included.

I claim:

1. A diffuser for introducing gases into liquids comprising, in combination, a body of porous material having the pores thereof coated with a thin, semi-permanent, surface film of a non-drying oleaginous material and atomizing means for applying to said body by impregnation a dispersion of said non-drying oleaginous material in admixture with the gas for diffusion.

2. A diffuser for introducing gases into liquids comprising, in combination, a body of porous material having the pores thereof coated with a thin, semi-permanent, superficial surface film of a light mineral lubricating oil and atomizing means for applying to said body by impregnation a mist of said oil in admixture with the gas for diffusion.

3. A diffuser for introducing gases into liquids comprising, in combination, a body of porous carbon having the pores thereof coated with a thin, semi-permanent, superficial surface film of a light mineral lubricating oil and atomizing means for applying to said body by impregnation a mist of said oil in admixture with the gas for diffusion.

4. In the diffusion of gases into liquids through a porous diffuser, a method for preventing plugging of the pores of said diffuser by solid matter contained or formed in said liquids, which comprises maintaining on the pore surfaces of said diffuser a thin film of a non-drying oleaginous material by impregnation with a dispersion of said material introduced into said diffuser in admixture with the gas for diffusion.

5. In the diffusion of gases into liquids through a porous diffuser, a method for preventing plugging of the pores of said diffuser by solid matter contained or formed in said liquids, which comprises maintaining on the pore surfaces of said diffuser a thin superficial film of light petroleum oil by impregnation with a mist of said oil introduced into said diffuser in admixture with the gas for diffusion.

6. In the aeration of sewage liquids by introduction of air through a porous diffuser, a method for preventing plugging of the pores of said diffuser by solid matter contained or formed in said sewage liquid, which comprises maintaining on the pore surfaces of said diffuser a thin film of oil by impregnation with a dispersion of said oil introduced into said diffuser in admixture with the air for diffusion.

7. In the aeration of sewage liquids by introduction of air through a porous carbon diffuser, a method for preventing plugging of the pores of said diffuser by solid matter contained or formed in said sewage liquid, which comprises maintaining on the pore surfaces of said diffuser a thin film of a light petroleum oil by impregnation with a mist of said oil introduced into said diffuser in admixture with the air for diffusion.

8. An apparatus for introducing gases into liquids comprising, in combination, a diffuser body of rigid porous material having the pores thereof coated with a thin, semi-permanent, surface film of light mineral lubricating oil; a gas supply conduit connected with said body; and means disposed within said conduit for introducing an oil mist thereinto, whereby a thin, semi-permanent, surface film of oil may be constantly maintained on said pore surfaces thus adapting said apparatus to uninterrupted and continuous operation.

9. An apparatus as claimed in claim 8 wherein the body of porous material comprises essentially a mass of uniformly sized solid carbon particles, bonded with porous carbon to form a rigid, uniformly porous material in which the pores are interconnected in all directions, said material being further characterized in that the lengths of the pore passages are very great in relation to their diameters.

LEROY C. WERKING.